(12) United States Patent
Kwun et al.

(10) Patent No.: US 7,860,056 B2
(45) Date of Patent: Dec. 28, 2010

(54) APPARATUS AND METHOD FOR ALLOCATING SUB-CHANNEL IN A WIRELESS COMMUNICATION SYSTEM

(75) Inventors: Jong-Hyung Kwun, Seoul (KR); Myeon-Gyun Cho, Seongnam-si (KR); Dae-Young Park, Seoul (KR); Hyung-Myung Kim, Daejeon (KR); Woo-Geun Ahn, Youngchoen-si (KR); Dae-Hyun Kim, Seongnam-si (KR); Tae-Sung Kang, Seoul (KR); Se-Ho Kim, Seoul (KR)

(73) Assignees: Samsung Electronics Co., Ltd (KR); Korea Advanced Institute of Science & Technology (KAIST) (KR)

( * ) Notice: Subject to any disclaimer, the term of this patent is extended or adjusted under 35 U.S.C. 154(b) by 860 days.

(21) Appl. No.: 11/707,521

(22) Filed: Feb. 16, 2007

(65) Prior Publication Data

US 2007/0206534 A1 Sep. 6, 2007

(30) Foreign Application Priority Data

Feb. 16, 2006 (KR) ............... 10-2006-0015084

(51) Int. Cl.
*H04W 4/00* (2009.01)
(52) U.S. Cl. ............... 370/329; 370/330; 370/332; 370/431; 455/450; 455/464; 455/441
(58) Field of Classification Search ............ 370/329, 370/330, 332, 455, 431; 455/450, 451, 452.1, 455/452.2, 453, 454, 455, 464, 509, 441
See application file for complete search history.

(56) References Cited

U.S. PATENT DOCUMENTS

| | | | | |
|---|---|---|---|---|
| 5,014,131 | A | * | 5/1991 | Reed et al. ............... 348/241 |
| 5,666,655 | A | * | 9/1997 | Ishikawa et al. ........... 455/512 |
| 5,956,642 | A | * | 9/1999 | Larsson et al. ............ 455/449 |

(Continued)

FOREIGN PATENT DOCUMENTS

KR 1020050053907 6/2005

(Continued)

OTHER PUBLICATIONS

Orthogonal Frequency Division Multiple Access with an Aggregated Sub-channel Structure and Statistical Channel Quality Measurement.

*Primary Examiner*—Kent Chang
*Assistant Examiner*—Magdi Elhag
(74) *Attorney, Agent, or Firm*—The Farrell Law Firm, LLP (57) ABSTRACT

A method for allocating a sub-channel in a wireless communication system is disclosed. The method includes measuring a moving velocity of each of mobile stations (MSs); selecting MSs to which a sub-channel is to be allocated; determining a resource allocation period for sub-channel allocation to the MSs using the measured moving velocity; calculating an average amount of data to be transmitted for the determined resource allocation period, and sending a channel quality information (CQI) request to the MSs; upon receipt of CQI in response to the CQI request, allocating a sub-channel satisfying the average data amount taking the CQI into account; and transmitting a control signal for the sub-channel allocation to the MSs.

8 Claims, 5 Drawing Sheets

U.S. PATENT DOCUMENTS

| | | | |
|---|---|---|---|
| 6,870,808 B1 * | 3/2005 | Liu et al. | 370/203 |
| 7,006,465 B2 * | 2/2006 | Toshimitsu et al. | 370/328 |
| 7,039,001 B2 * | 5/2006 | Krishnan et al. | 370/203 |
| 7,116,957 B2 * | 10/2006 | Sih et al. | 455/266 |
| 7,388,847 B2 * | 6/2008 | Dubuc et al. | 370/329 |
| 7,463,616 B1 * | 12/2008 | Earnshaw et al. | 370/347 |
| 7,463,631 B2 * | 12/2008 | Bao et al. | 370/394 |
| 7,545,763 B2 * | 6/2009 | Wunder et al. | 370/319 |
| 2002/0176380 A1 * | 11/2002 | Holtzman et al. | 370/329 |
| 2004/0001429 A1 | 1/2004 | Ma et al. | |
| 2005/0025039 A1 * | 2/2005 | Hwang et al. | 370/206 |
| 2005/0085235 A1 * | 4/2005 | Park et al. | 455/450 |
| 2005/0180313 A1 | 8/2005 | Kim et al. | |
| 2006/0039318 A1 * | 2/2006 | Oh et al. | 370/328 |
| 2007/0010290 A1 * | 1/2007 | Iida et al. | 455/560 |

FOREIGN PATENT DOCUMENTS

| | | |
|---|---|---|
| WO | WO 2005/096531 | 10/2005 |

* cited by examiner

APPARATUS AND METHOD FOR ALLOCATING SUB-CHANNEL IN A WIRELESS COMMUNICATION SYSTEM

PRIORITY

This application claims the priority under 35 U.S.C. §119 (a) to an application entitled "Apparatus and Method for Allocating Sub-Channel In A Wireless Communication System" filed in the Korean Intellectual Property Office on Feb. 16, 2006 and assigned Serial No. 2006-15084, the contents of which are incorporated herein by reference.

BACKGROUND OF THE INVENTION

1. Field of the Invention

The present invention relates generally to a communication system, and in particular, to an apparatus and method for allocating sub-channels taking moving velocities of mobile stations into account in a wireless communication system.

2. Description of the Related Art

Orthogonal Frequency Division Multiplexing (OFDM) and Orthogonal Frequency Division Multiple Access (OFDMA), both of which are a data transmission scheme using multiple carriers, are a type of Multi-Carrier Modulation (MCM) scheme that converts a serial input symbol stream into parallel symbol streams, and modulates them with multiple orthogonal sub-carriers, i.e., multiple orthogonal sub-carrier channels, before transmission.

In the wireless communication system that transmits data using multiple carriers, sub-carriers in one OFDM symbol are shared by a plurality of users. The wireless communication system uses a plurality of sub-carriers. Of the sub-carriers, some sub-carriers are used as pilot sub-carriers, and the other sub-carriers except for the pilot sub-carriers are used as data sub-carriers. The wireless communication system classifies the data sub-carriers into sub-channels each having a predetermined number of data sub-carriers, and allocates the sub-channels to a plurality of users according to system conditions.

Figure 1:
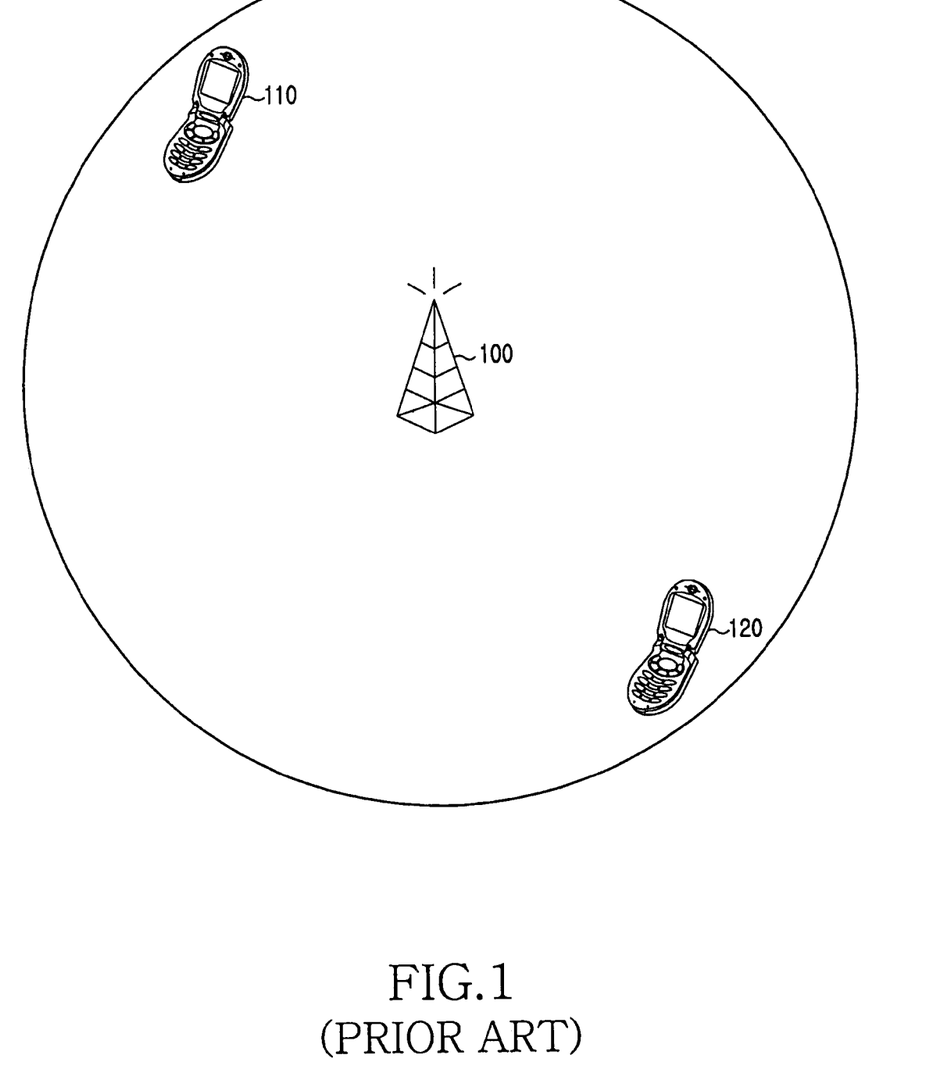
FIG. 1 is a diagram schematically illustrating a configuration of a general wireless communication system.

Herein, the term "sub-channel" refers to a channel that includes a plurality of sub-carriers. As a result, the wireless communication system aims at acquiring frequency diversity gain by spreading all sub-carriers, especially data sub-carriers used in the system over the full frequency band. With reference to FIG. 1, a description will now be made of a configuration of a wireless communication system using multiple carriers (known as a multi-carrier wireless communication system).

FIG. 1 is a diagram schematically illustrating a configuration of a general wireless communication system.

For the sake of clarity, it will be assumed in FIG. 1 that the wireless communication system has a single-cell configuration, and includes a base station (BS) 100 and mobile stations (MSs) 110 and 120 managed by the BS 100.

The channel environments measured by the MSs 110 and 120 suffer different shadowing losses and path losses, are independent of each other according to movements of the MSs, and have time-varying characteristics. Due to these channel characteristics, the BS 100 allocates sub-channels to the MSs taking the channel environments into account, thereby increasing the overall data transmission efficiency of the system. The BS 100 employs an Adaptive Modulation and Coding (AMC) technique that adaptively changes a modulation technique and a coding technique taking into account the channel environments of the MSs 110 and 120. That is, the BS 100 uses the high-efficiency modulation and coding techniques for a good channel environment, and the low-efficiency modulation and coding techniques for a bad channel environment.

The BS 100 sends a Channel Quality Information (CQI) request to the MSs 110 and 120 located in its service coverage to allocate sub-channels to the MSs 110 and 120. The MSs 110 and 120 measure CQI of each sub-channel in response to the CQI request from the BS 100.

The MSs 110 and 120 feed back, i.e., transmit, their respective measured CQI to the BS 100. The MSs 110 and 120 periodically transmit the CQI to the BS 100. The BS 100, upon receiving the corresponding CQI, performs sub-channel allocation using the corresponding received CQI.

In this wireless communication system, a BS transmits a control signal to corresponding MSs to perform resource allocation, i.e., sub-channel allocation, to the corresponding MSs. The control signal includes sub-channel allocation information and Modulation and Coding Scheme (MCS) level information for the sub-channel allocation. However, the BS allocates sub-channels to the MSs in a one-frame interval, i.e., every frame. As the control signal for sub-channel allocation is transmitted to MSs in the cell every frame, the control signal for sub-channel allocation may serve as signaling overhead when data is transmitted to MSs in a communication system.

SUMMARY OF THE INVENTION

It is, therefore, an object of the present invention to provide a sub-channel allocation apparatus and method for reducing signaling overhead in a wireless communication system.

It is another object of the present invention to provide an apparatus and method for performing sub-channel allocation taking moving velocities of mobile stations into account.

According to one aspect of the present invention, there is provided a method for allocating a sub-channel in a wireless communication system. The method includes measuring a moving velocity of each of mobile stations (MSs); selecting MSs to which a sub-channel is to be allocated; determining a resource allocation period for sub-channel allocation to the MSs using the measured moving velocity; calculating an average amount of data to be transmitted for the determined resource allocation period, and sending a channel quality information (CQI) request to the MSs; upon receipt of CQI in response to the CQI request, allocating a sub-channel satisfying the average data amount taking the CQI into account; and transmitting a control signal for the sub-channel allocation to the MSs.

According to another aspect of the present invention, there is provided an apparatus for allocating a sub-channel in a wireless communication system. The apparatus includes a moving velocity measurer for measuring a moving velocity of each of mobile stations (MSs); a resource allocation period decider for selecting MSs to which a sub-channel is to be allocated, and determining a resource allocation period for sub-channel allocation to the MSs using the measured moving velocities of the MSs; an average data amount calculator for receiving the determined resource allocation period from the resource allocation period decider, and calculating an average amount of data to be transmitted to each of the MSs for the determined resource allocation period; a resource allocator for allocating a sub-channel satisfying the average data amount taking channel quality information (CQI) of the MSs into account; and a transmitter for generating a control signal for the sub-channel allocated by the resource allocator, and transmitting the generated control signal to the MSs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention is directed to an apparatus and method for allocating resources, i.e., sub-channels, taking moving velocities of mobile stations (MSs) into account in a wireless communication system. To this end, a base station (BS) measures moving velocities of MSs, and selects the MSs to which it will allocate sub-channels, based on the measured moving velocities. The BS determines a sub-channel allocation period, i.e., a frame interval, optimal for the selected MSs, and allocates the sub-channels to the selected MSs for the frame interval.

Figure 2:
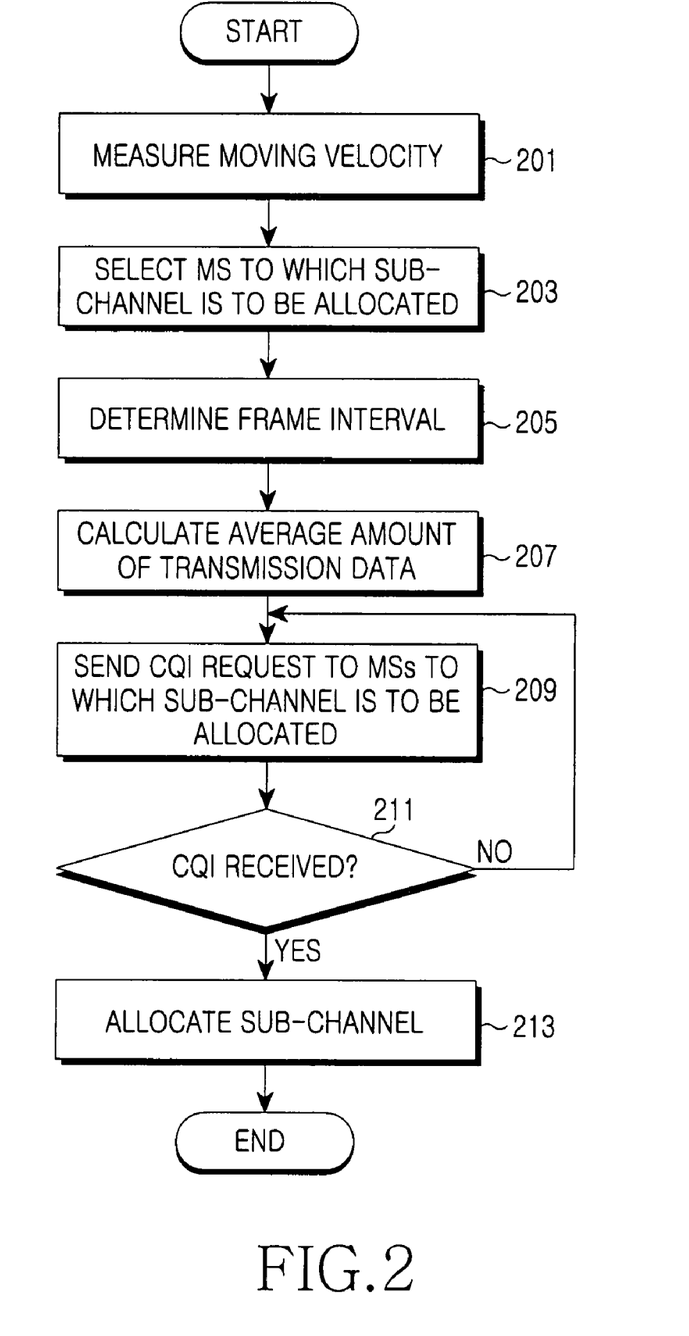
FIG. 2 is a flowchart schematically illustrating a BS operation of performing sub-channel allocation in a wireless communication system according to the present invention.

Therefore, the present invention will be described with reference to a communication system capable of supporting the sub-channel allocation, i.e., an Orthogonal Frequency Division Multiple Access (OFDMA) communication system. With reference to FIG. 2, a description will now be made of a BS operation of allocating sub-channels in the OFDMA wireless communication system.

FIG. 2 is a flowchart schematically illustrating a BS operation of performing sub-channel allocation in a wireless communication system according to the present invention.

Referring to FIG. 2, a BS measures velocities of MSs in step 201. However, each of the MSs may also measure its moving velocity and transmit this measured moving velocity information to the BS. However, because the latter method requires additional resources, for the sake of clarity, the present invention will be described with reference to the former method in which the BS measures moving velocities of all MSs in its cell. In this regard, the BS calculates the moving velocities of the MSs using signals received from the MSs.

The moving velocity calculation method can calculate a moving velocity using, for example, an adaptive transversal filter, which is a kind of an adaptive filter, or calculate a moving velocity using a level crossing rate indicating how may times a received signal has crossed a particular level per second in a positive (+) direction.

In step 203, the BS selects the MS to which it will allocate a sub-channel. Herein, compared with the conventional sub-channel allocation method in which the BS allocates sub-channels every frame, the sub-channel allocation method according to the present invention provides that each of MSs determines a sub-channel allocation period according to its own moving velocity. Accordingly, the MSs have different channel allocation periods. Therefore, the BS selects the MSs which need to be allocated sub-channels, because there is no need to perform sub-channel allocation for the MSs that have already been allocated sub-channels.

In step 205, the BS determines a frame interval. The BS determines a sub-channel allocation period, i.e., a frame interval for which it will allocate sub-channels to the MSs. Herein, the frame interval includes a predetermined number of frames. The predetermined number of frames for determining the frame interval is represented by Equation (1):

$$N_k[t] \left\lfloor \sqrt{\frac{9}{16\pi}} \frac{c}{f_c v_k[t]} \frac{1}{L_f} \Delta \varpi \Delta \tau \right\rfloor \quad (1)$$

Equation (1) represents the number of resource allocation frames in a $t^{th}$ frame for a $k^{th}$ MS. In Equation (1), $f_c$ denotes a carrier frequency, $v_k[t]$ denotes a moving velocity of a $t^{th}$ frame for a $k^{th}$ MS, $L_f$ denotes a frame length, $\Delta \omega$ denotes an MS's moving velocity estimation error factor, c denotes the propagation velocity of electromagnetic waves and $\Delta \tau$ denotes a CQI estimation error factor. The $\Delta \omega$ and the $\Delta \tau$ are defined as Equation (2):

$$0 < \Delta \omega \leq 1, \Delta \omega \propto (\text{mobilespeederror})^{-1}$$

$$0 < \Delta \tau \leq 1, \Delta \tau \propto (\text{CQIerror})^{-1} \quad (2)$$

In Equation (2), $\Delta \omega$ and $\Delta \tau$ both have a value which exceeds 0 and is less than or equal to 1. The $\Delta \omega$ is inversely proportional to an MS's velocity error, and the $\Delta \tau$ is inversely proportional to a CQI error. Because the MS's moving velocity estimation error and the CQI error affect the entire system performance in the process of determining the frame interval, the $\Delta \omega$ and $\Delta \tau$ are taken into consideration in Equation (1).

In conclusion, the BS determines a sub-channel allocation period, i.e., a frame interval, using Equation (1). Because the present invention takes the moving velocities of the MSs into consideration, the BS determines a frame interval by classifying the moving velocities measured in step 201 according to a predetermined criterion. The number of frames for determining a frame interval taking the moving velocities into account is represented by Equation (3):

$$N_k[t] = \left\lfloor \sqrt{\frac{9}{16\pi}} \frac{c \cdot \Delta \varpi \Delta \tau}{f_c \cdot (1 \text{ Km/hr})} \frac{1}{L_f} \right\rfloor, \quad (3)$$

if $v_k[t] \leq 1$ Km/hr $$N_k[t] = \left\lfloor \sqrt{\frac{9}{16\pi}} \frac{c \cdot \Delta \varpi \Delta \tau}{f_c \cdot (3 \text{ Km/hr})} \frac{1}{L_f} \right\rfloor,$$

if 1 Km/hr $< v_k[t] \leq 3$ Km/hr $$N_k[t] = \left\lfloor \sqrt{\frac{9}{16\pi}} \frac{c \cdot \Delta \varpi \Delta \tau}{f_c \cdot v_k[t]} \frac{1}{L_f} \right\rfloor,$$

if $v_k[t] > 3$ Km/hr

According to the present invention, the moving velocities of users may be classified into 3 types, and the number of frames according to the classified moving velocities.

In Equation (3), the MSs are classified into MSs with $v_k[t] \leq 1$ Km/hr, MSs with 1 Km/hr$<v_k[t] \leq 3$ Km/kr, and MSs with $v_k[t]>3$ Km/hr. When allocating sub-channels to the MSs located in its cell, the BS determines the frame interval taking the moving velocities $v_k[t]$ of Equation (3) into consideration.

In the case of determining the frame interval in accordance with Equation (3), the BS does not need to allocate sub-channels for all MSs every frame, reducing the overhead caused by the transmission of the control signal according to the increased sub-channel allocation period.

In step 207, the BS calculates an average amount of data to be transmitted to each MS.

If the number of resource allocation frames for the MSs is determined, the BS does not change the CQI and the MCS level for this frame interval. Therefore, the BS determines the total amount of data to be transmitted for the frame interval for which it should allocate the sub-channels, using a scheduler, and calculates an average amount of data the MS will transmit. Herein, the average data amount is defined as Equation (4):

$$D_k = \frac{1}{N_k[t]} \cdot \left( \sum_{i=0}^{N_k[t]-1} d_k[t+1] \right) \quad (4)$$

Equation (4) represents an average amount $D_k$ of data that a $k^{th}$ MS will transmit for a frame interval $N_k[t]$ in a $t^{th}$ frame. Equation (4), $d_k[t]$ denotes the amount of data that the BS should transmit to a $k^{th}$ MS in a $t^{th}$ frame.

In step 209, the BS sends a CQI request to the MSs to which it will allocate sub-channels. If the average amount of data to be transmitted to the MSs is determined, the BS should determine a sub-channel through which it will transmit data to each of the MSs, and an MCS level to be applied to the sub-channel. For this purpose, the BS needs information on the quality of each sub-channel, and thus sends a CQI request to the MSs to which it will allocate sub-channels. In response to the CQI request, the BS receives CQI from the MSs for some sub-channels having a high sub-channel allocation probability. As a result, the novel sub-channel allocation scheme requires less overhead than the conventional sub-channel allocation scheme in terms of the amount of CQI in the uplink.

In step 211, the BS determines if it has received CQI in response to the CQI request. Upon failure to receive the CQI, the BS returns to step 209. However, upon receipt of the CQI, the BS proceeds to step 213.

In step 213, the BS performs sub-channel allocation to the MSs. The BS determines a sub-channel for data transmission to the MSs using the average data amount and the CQI received from the MSs, and determines an MCS level to be applied to the sub-channel. The BS transmits a control signal for the sub-channel allocation to the MSs. Thereafter, the BS transmits data to the MSs according to the sub-channel allocation.

The control signal transmitted from the BS to the MS according to the sub-channel allocation includes sub-channel allocation information indicating which MS should use each sub-channel, and MCS level information indicating a modulation mode and a coding rate, to be applied to each sub-channel.

In conclusion, the BS transmits the sub-channel allocation information and the MCS level information to all MSs in its cell, and also transmits the above information only to the users to which it will allocate the sub-channel, thus increasing in length of the sub-channel allocated to each MS, compared with the conventional resource allocation scheme. The increase in the length of the sub-channel contributes to a decrease in the amount of the control signal that the BS transmits. Next, with reference to FIG. 3, a description will be made of a structure of a sub-channel allocated to MSs by a BS according to the present invention.

Figure 3:
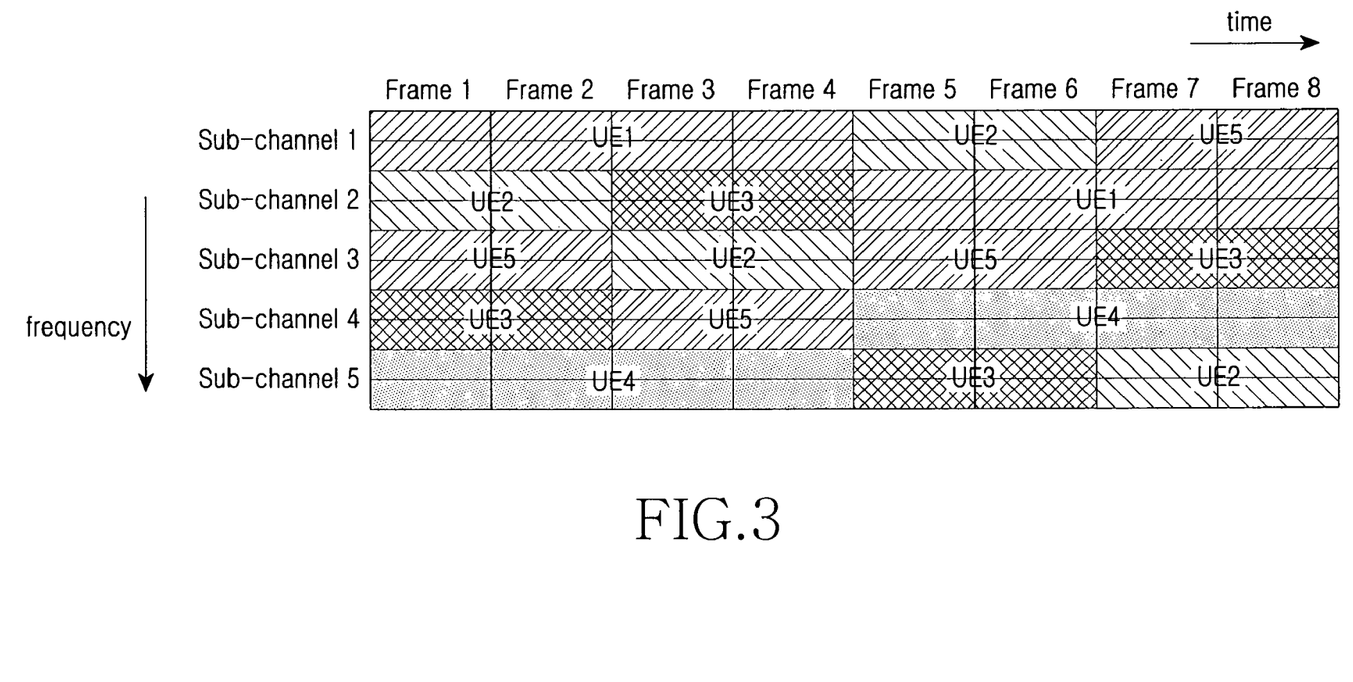
FIG. 3 is a diagram schematically illustrating a structure of a sub-channel allocated by a BS according to the present invention.

FIG. 3 is a diagram schematically illustrating a structure of a sub-channel allocated by a BS according to the present invention.

It is assumed in FIG. 3 that the BS allocates 5 sub-channels to 5 MSs along the frequency axis and the time axis.

The BS allocates a first sub-channel to a first MS (or a first user equipment (UE)) in a first frame to a fourth frame, and allocates a second sub-channel to the first MS in a fifth frame to an eighth frame.

The BS allocates the second sub-channel to a second MS in the first frame and the second frame, allocates a third sub-channel to the second MS in the third frame and the fourth frame, allocates the first sub-channel to the second MS in the fifth frame and the sixth frame, and allocates a fifth sub-channel to the second MS in the seventh frame and the eighth frame.

The BS allocates a fourth sub-channel to a third MS in the first frame and the second frame, allocates the second sub-channel to the third MS in the third frame and the fourth frame, allocates the fifth sub-channel to the third MS in the fifth frame and the sixth frame, and allocates the third sub-channel to the third MS in the seventh frame and the eighth frame.

Next, the BS allocates the fifth sub-channel to a fourth MS in the first frame to the fourth frame, and allocates the fourth sub-channel to the fourth MS in the fifth frame to the eighth frame.

Finally, the BS allocates the third sub-channel to a fifth MS in the first frame and the second frame, allocates the fourth sub-channel to the fifth MS in the third frame and the fourth frame, allocates the third sub-channel to the fifth MS in the fifth frame and the sixth frame, and allocates the first sub-channel to the fifth MS in the seventh frame and the eighth frame.

The MSs experiencing fewer variations in moving velocity are assigned a greater number of frames included in a corresponding frame interval during sub-channel allocation.

Figure 4:
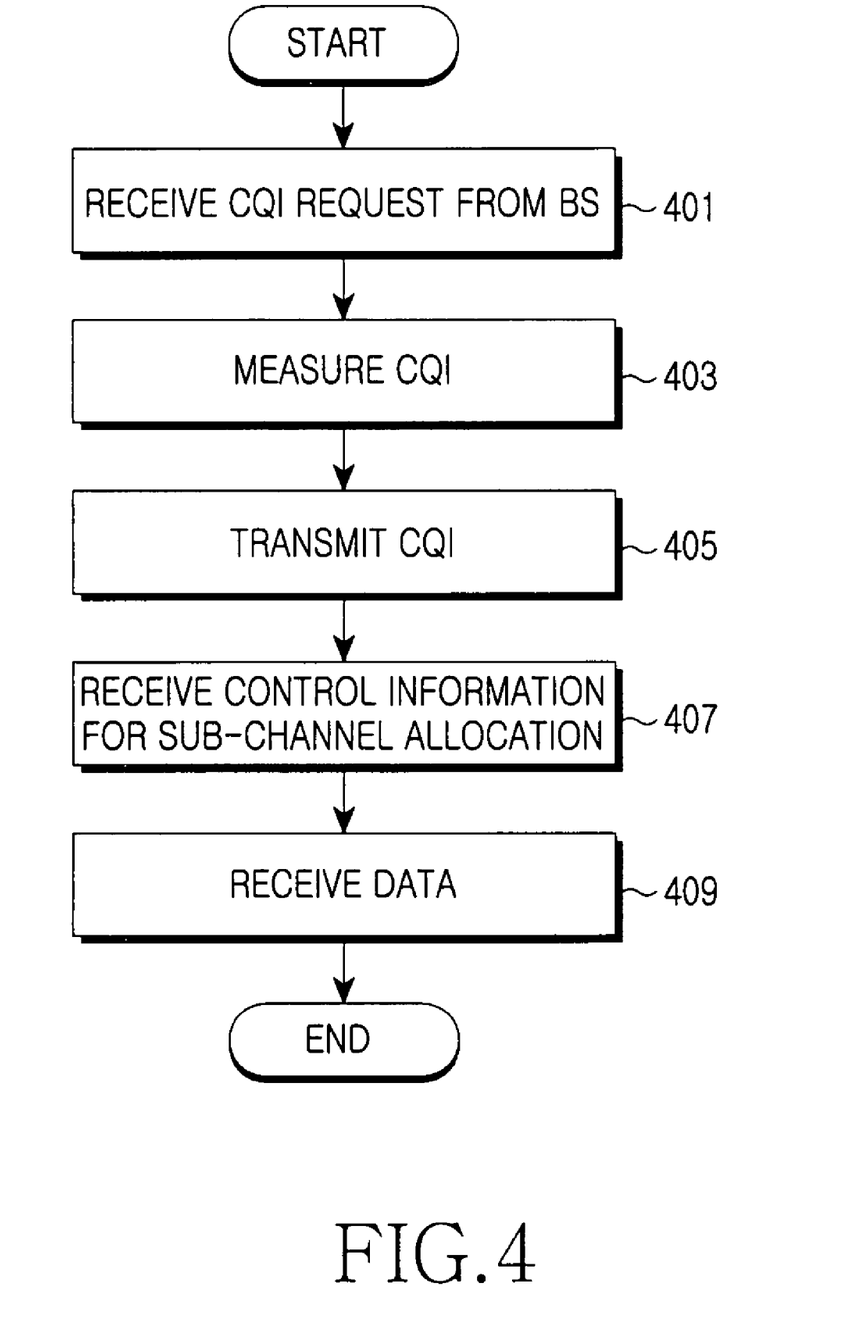
FIG. 4 is a flowchart schematically illustrating an operation of an MS allocated a sub-channel in a wireless communication system according to the present invention.

In FIG. 3, the BS allocates predetermined frame intervals to MSs taking moving velocities of the MS into account during sub-channel allocation, and in the allocated frame intervals, the BS does not transmit the control signal to the MSs. In conclusion, the BS uses the same MCS level through the sub-channel allocated based on the control signal in the frame interval. With reference to FIG. 4, a description will now be made of an operation of an MS allocated a sub-channel from the BS.

FIG. 4 is a flowchart schematically illustrating an operation of an MS allocated a sub-channel in a wireless communication system according to the present invention.

Referring to FIG. 4, in step 401, the MS receives a CQI request from a BS. Herein, the CQI refers to the information needed by the BS for sub-channel allocation.

In step 403, the MS measures CQI in response to the CQI request from the BS. Alternatively, the MS can measure CQI for all sub-channels thereof and transmit the measured CQI to the BS. However, the MS measures CQI for a predetermined number of sub-channels or some sub-channels having a high sub-channel allocation possibility according to the CQI of the sub-channels having the high channel quality.

In step 405, the MS transmits the measured CQI to the BS.

In step 407, the MS receives a control signal for the sub-channel allocation from the BS. The control signal, as described above, includes sub-channel allocation information and MCS level information.

In step 409, the MS receives data from the BS using the sub-channel allocation information.

Next, with reference to FIG. 5, a description will be made of a structure of the BS described in connection with FIG. 2.

Figure 5:
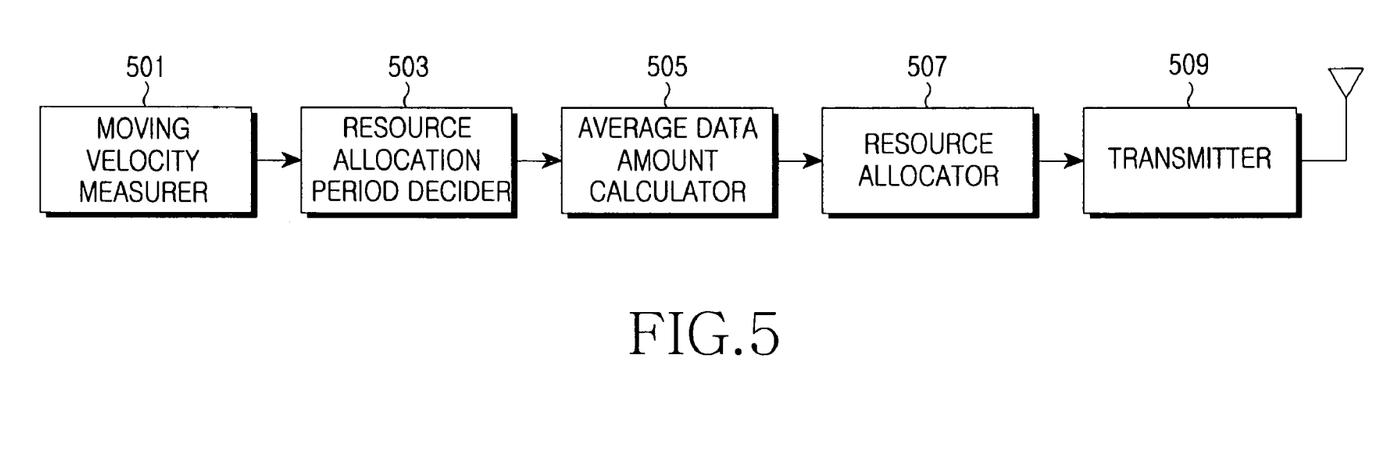
FIG. 5 is a block diagram schematically illustrating a structure of a BS for performing sub-channel allocation in a wireless communication system according to the present invention.

FIG. 5 is a block diagram schematically illustrating a structure of a BS for performing sub-channel allocation in a wireless communication system according to the present invention.

Referring to FIG. 5, the BS for sub-channel allocation includes a moving velocity measurer 501, a resource allocation period decider 503, an average data amount calculator 505, a resource allocator 507, and a transmitter 509.

The moving velocity measurer 501 measures a moving velocity of each MS that the BS services. To calculate moving velocities of MSs, the moving velocity measurer 501 may calculate a moving velocity of each of the MSs using the signal received from each of the MSs. The moving velocity measurer 501 can calculate a moving velocity using, for example, an adaptive transversal filter, which is a kind of an adaptive filter, or calculate a moving velocity using a level crossing rate indicating how may times a received signal has crossed a particular level per second in a positive (+) direction. However, it is also envisioned that one or more MSs may calculate their own velocity and transmit the calculated velocity to the BS.

The resource allocation period decider 503 selects the MS to which the BS will allocate a sub-channel. Herein, compared with the conventional sub-channel allocation method in which the BS allocates sub-channels every frame, the sub-channel allocation method according to the present invention provides that each of MSs determines a sub-channel allocation period according to its own moving velocity, so the MSs have different channel allocation periods. Therefore, the resource allocation period decider 503 selects the MSs which need to be allocated sub-channels, because there is no need to perform sub-channel allocation for the MSs that have already been allocated sub-channels.

The resource allocation period decider 503 determines a frame interval for resource allocation. In other words, the resource allocation period decider 503 determines a sub-channel allocation period, i.e., determines a frame interval that the BS will allocate to the MS. Herein, the frame interval includes a predetermined number of frames, and the number of frames for determining the frame interval has been described in detail with reference to FIG. 2, so a description thereof will be omitted. Therefore, the resource allocation period decider 503 determines a sub-channel allocation period, i.e., a frame interval, using Equation (1). In the present invention, because the BS takes a moving velocity of each of the MSs into account, the resource allocation period decider 503 determines a frame interval by classifying the moving velocities measured by the moving velocity measurer 501 according to a predetermined criterion. The number of frames for determining the frame interval taking the moving velocities into account is shown in Equation (3) and FIGS. 2-3, by way of example. Therefore, in determining the frame interval, the resource allocation period decider 503 does not allocate sub-channels for all MSs every frame, resulting in a reduction in the overhead caused by the transmission of the control signal according to the increased sub-channel allocation period.

The average data amount calculator 505 calculates an average amount of data to be transmitted to each of the MSs. In the present invention, if the number of resource allocation frames for the MSs is determined, the BS does not change the CQI and the MCS level for this frame interval. Therefore, the resource allocation period decider 503 determines the total amount of data to be transmitted for the frame interval for which the BS should allocate the sub-channels, using a scheduler (not shown), and calculates an average amount of data the MS will transmit. As described above, the average data amount is calculated in accordance with Equation (4).

The resource allocator 507 uses CQI of each of the MSs to which the BS will allocate sub-channels. If the average data amount calculated by the average data amount calculator 505 is determined, the resource allocator 507 determines a sub-channel for data transmission to the MSs, and an MCS level to be applied to the sub-channel. The resource allocator 507 performs resource allocation, i.e., sub-channel allocation, to each of the MSs. Therefore, the resource allocator 507 determines a sub-channel for data transmission to the MSs using the average data amount and the CQI received from the MSs, and determines an MCS level to be applied to the sub-channel.

The transmitter 509 generates a control signal for sub-channel allocation of the source allocator 507, and transmits the data for the sub-channel allocation to the corresponding MSs. The control signal includes sub-channel allocation information indicating which MS should use each sub-channel, and MCS level information indicating a modulation mode and a coding rate, to be applied to each sub-channel.

In conclusion, the BS not only transmits the sub-channel allocation information and the MCS level information to all MSs in its cell, but also transmits the above information only to the users to which it will allocate the sub-channel, thus increasing in length of the sub-channel allocated to each MS, compared with the conventional resource allocation scheme. The increase in the length of the sub-channel contributes to a decrease in the amount of the control signal that the BS transmits.

The BS, as described above, allocates sub-channels in units of a predetermined number of frames taking a moving velocity of each MS into account, decreasing the amount of the control signal transmitted in the downlink between the BS and the MS. The decrease in the amount of the control signal contributes to an increase in the system throughput.

As can be understood from the foregoing description, the wireless communication system according to the present invention allocates a predetermined frame interval to an MS taking a moving velocity of the MS into account, contributing to a decrease in the amount of the control signal transmitted for the conventional sub-channel allocation. The decrease in the amount of the control signal reduces the signaling overhead in the communication system, and the reduction in the signaling overhead contributes to an increase in the system throughput. In addition, the present invention performs sub-channel allocation to a predetermined number of MSs during actual sub-channel allocation, decreasing complexity for sub-channel allocation due to the difference in the frame interval for sub-channel allocation, i.e., the resource allocation period.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for allocating a sub-channel in a wireless communication system, the method comprising the steps of:
   measuring a moving velocity of each of mobile stations (MSs);
   selecting at least one MS, to which a sub-channel is to be allocated, among the MSs;
   identifying a type corresponding to a moving velocity of the at least one MS;
   determining a sub-channel allocation period for sub-channel allocation to the at least one MS depending on the identified type;
   calculating an average amount of data to be transmitted for the determined sub-channel allocation period, and transmitting a channel quality information (CQI) request to the at least one MS;
   allocating a sub-channel satisfying the average data amount taking a CQI into account, to the at least one MS, when the CQI is received from the at least one MS;
   transmitting a control signal for the sub-channel allocation to the at least one MS; and
   determining a frame interval according to the determined sub-channel allocation period,
   wherein a number of frames included in the determined frame interval is determined depending on the measured moving velocity, and is expressed as $$N_k[t] = \left\lfloor \sqrt{\frac{9}{16\pi} \frac{c}{f_c v_k[t]} \frac{1}{L_f} \Delta\varpi \Delta\tau} \right\rfloor$$

where $N_k[t]$ represents a number of frames in a $t^{th}$ frame interval allocated to a $k^{th}$ MS, c denotes a propagation velocity of electromagnetic waves, $f_c$ denotes a carrier frequency, $v_k[t]$ denotes a moving velocity of the $k^{th}$ MS in a $t^{th}$ frame, $L_f$ denotes a frame length, $\Delta\omega$ denotes a moving velocity estimation error factor of the $k^{th}$ MS, and $\Delta\tau$ denotes a CQI estimation error factor.

2. The method of claim 1, wherein the step of measuring a moving velocity comprises measuring the moving velocity of each of the MSs using an adaptive transversal filter.

3. The method of claim 1, wherein the step of measuring a moving velocity comprises measuring the moving velocity of each of the MSs using a level crossing rate.

4. The method of claim 1, wherein the control signal includes sub-channel allocation information and Modulation and Coding Scheme (MCS) level information.

5. An apparatus for allocating a sub-channel in a wireless communication system, the apparatus comprising:
   a moving velocity measurer for measuring a moving velocity of each of mobile stations (MSs);
   a resource allocation period decider for selecting at least one MS to which a sub-channel is to be allocated, among the MSs, identifying a type corresponding to a moving velocity of the at least one MS, and determining a sub-channel allocation period for sub-channel allocation to the at least one MS depending on the identified type;
   an average data amount calculator for calculating an average amount of data to be transmitted to each of the MSs using the sub-channel allocation period determined from the resource allocation period decider;
   a resource allocator for allocating a sub-channel satisfying the average data amount taking a channel quality information (CQI) of the at least one MS into account, to the at least one MS, when the CQI is received from the at least one MS; and
   a transmitter for generating a control signal for the sub-channel allocated by the resource allocator, and transmitting the generated control signal to the at least one MS,
   wherein the resource allocation period decider determines a frame interval according to the determined sub-channel allocation period,
   wherein a number of frames included in the determined frame interval is determined depending on the measured moving velocity, and is expressed as $$N_k[t] = \left\lfloor \sqrt{\frac{9}{16\pi} \frac{c}{f_c v_k[t]} \frac{1}{L_f} \Delta\varpi \Delta\tau} \right\rfloor$$

where $N_k[t]$ represents a number of frames in a $t^{th}$ frame interval allocated to a $k^{th}$ MS, c denotes a propagation velocity of electromagnetic waves, $f_c$ denotes a carrier frequency, $v_k[t]$ denotes a moving velocity of the $k^{th}$ MS in a $t^{th}$ frame, $L_f$ denotes a frame length, $\Delta\omega$ denotes a moving velocity estimation error factor of the $k^{th}$ MS, and $\Delta\tau$ denotes a CQI estimation error factor.

6. The apparatus of claim 5, wherein the moving velocity measurer measures the moving velocity of each of the MSs using an adaptive transversal filter.

7. The apparatus of claim 5, wherein the moving velocity measurer measures the moving velocity of each of the MSs using a level crossing rate.

8. The apparatus of claim 5, wherein the control signal includes sub-channel allocation information and Modulation and Coding Scheme (MCS) level information.

* * * * *